United States Patent [19]

Keim et al.

[11] 4,149,975

[45] Apr. 17, 1979

[54] ASBESTOS-FREE FILTERING LAYER

[75] Inventors: Ernst Keim, Mörschwil SG; Istvan Laczko, Gossau SG; Carl Ryffel, Abtwil SG, all of Switzerland

[73] Assignee: Filtrox-Werk AG, St. Gallen, Switzerland

[21] Appl. No.: 837,285

[22] Filed: Sep. 27, 1977

Related U.S. Application Data

[63] Continuation of Ser. No. 657,650, Feb. 12, 1976, abandoned.

[30] Foreign Application Priority Data

Feb. 15, 1975 [CH]  Switzerland ......................... 1857/75

[51] Int. Cl.² ............................................... B01D 15/00
[52] U.S. Cl. .................................................... 210/502
[58] Field of Search .......................... 210/24, 502–506, 210/508; 252/463

[56] References Cited

U.S. PATENT DOCUMENTS

| | | | |
|---|---|---|---|
| 2,655,552 | 10/1953 | Fuller et al. | 210/502 X |
| 3,252,270 | 5/1966 | Pall et al. | 210/505 X |
| 3,420,709 | 1/1969 | Barrett, Jr. et al. | 210/502 X |
| 3,853,789 | 12/1974 | Warthen et al. | 252/463 |

FOREIGN PATENT DOCUMENTS

| | | | |
|---|---|---|---|
| 2312040 | 9/1974 | Fed. Rep. of Germany | 210/502 |
| 2444947 | 3/1975 | Fed. Rep. of Germany | 210/508 |

*Primary Examiner*—William A. Cuchlinski, Jr.
*Attorney, Agent, or Firm*—William J. Daniel

[57] ABSTRACT

Equal or better adsorbency at lower cost is obtained with a sheet filter of the type having a filtering layer comprised of a supporting layer formed of at least one fibrous material with at least one adsorbent material evenly distributed within the supporting layer, when the adsorbent material consists essentially of γ-aluminum oxide instead of asbestos. A supplementary organic adsorbent material can be incorporated together with an inorganic filler such as kaolin or kieselguhr.

9 Claims, No Drawings

ASBESTOS-FREE FILTERING LAYER

This is a continuation of Ser. No. 657,650, filed Feb. 12, 1976 now abandoned.

The invention relates to an asbestos-free filtering layer with a supporting structure of at least one fibrous material as well as with at least one adsorbing material for the adsorprion of turbid matter, and evenly distributed within the supporting structure.

Filtering layers usually referred to as filter sheets, for sheet filters have hitherto contained in most cases asbestos which has been used both as adsorbing material and for the formation of the structure or for the consolidation of the filtering layer. Only in a few fields of application, for example for the so-called kieselguhr filtration in beer production, were asbestos-free layers used as bearer layers, but these filtering layers consist in principle only in a supporting structure of fibrous materials, which structure is, when required, further provided with fillers, but contains no adsorbing materials.

In sheet filters with adsorbing materials, on the other hand, asbestos has been used so far as adsorbing material practically exclusively, because asbestos, on account of its fibrous structure in addition to its good adsorption properties, further possesses properties which improve consolidation, and appeared for this reason to be in any event more favourable than other materials simply exhibiting good adsorption properties. However, it has been found that this hitherto generally adopted assumption as the practically exclusive utilization of asbestos shows is not valid in all circumstances, i.e. that under certain circumstances it may yet be more advantageous to use as adsorbing material such a material as exhibits exclusively good adsorption properties and has no further desirable properties for utilization in filtering layers.

The object of the invention was to produce a filtering layer of the type mentioned hereinabove which exhibits eith general properties comparable with those of another adsorbing material such as asbestos for a lower total utilization, such as the known filter layers containing asbestos, or general properties that are better than those of asbestos-containing filter layers, for an almost similar total utilization.

In accordance with the invention this is achieved in a filtering layer of the type described hereinabove in that it contains $\gamma$-aluminium oxide as the adsorbing material.

The advantage achieved as a result, as will be explained in greater detail hereinunder, is a not unsubstantial reduction of general manufacturing costs for the filtering layer under consideration for substantially similar overall qualities as in asbestos-containing filtering layers.

In addition to $\gamma$-aluminium oxide, the filtering layer under consideration may advantageously contain additionally at least one adsorbing material consisting in an organic compound, preferably from the groups of ion-exchanging resins.

Preferably, the filtering layer under consideration further contains, in the same way as the known filtering layers, alumina, in particular kaolin, as filler in the gaps formed by the supporting structure.

The fibrous material forming the supporting structure may in the filtering layer under consideration may consist, in the same manner as in the case of the known filtering layers advantageously at least partly in cellulose, preferably sulphite and/or sulphate cellulose.

In addition, in particular for the structural construction of the filtering layer under consideration, it is of considerable advantage if kieselguhr is additionally embedded into the supporting structure.

The invention is described in greater detail hereinbelow as regards its basic principles and on the basis of an example of embodiment:

It was surprisingly found when making tests for the manufacture of asbestos-free filtering layers of the kind mentioned hereinabove that on using $\gamma$-aluminium oxide as adsorbing material, in about a quarter of the percentage proportion which the usual asbestos-containing filtering layers contain in asbestos, the same adsorption effect can be achieved as with the asbestos-containing filtering layers, although the improvement of the adsorption effect which is to be expected theoretically on the basis of the per se known adsorption effects of the two materials, asbestos and $\gamma$-aluminium oxide is considerably smaller. The reasons for the surprising result that in a filtering layer with a relatively small amount of $\gamma$-aluminium oxide the same adsorption effect is achieved as with the many times greater amount of asbestos, have not yet been able to be ascertained beyond doubt, but the investigations carried out so far in this connection show that of the total surface of the asbestos in an asbestos-containing filtering layer only a portion is active as adsorbing surface, while in a relatively small amount of $\gamma$-aluminium oxide stored in this filtering layer practically the whole surface thereof takes part in the adsorption. This would be also utterly understandable, as the asbestos fibres in a filtering layer, because of their matting with the cellulose fibres, can be washed by the liquid passing through the filtering layer only for parts of their overall fibre length, while, as opposed to this, in the case, for example, of the $\gamma$-aluminium oxide stored in the filtering layer in the form of the smallest particle the whole surface thereof is washed by the liquid.

In any event, the reduction of the necessary amount of adsorbents to one quarter which is obtainable with the filtering layer under consideration, in spite of the fact that the cost per unit of weight for $\gamma$-aluminium oxide is more or less one and a half to two times as great as for aspectos, brings about a reduction of cost for the adsorbents of at least 50 percent, and as the cost per unit of weight for the other materials contained in a filtering layer is smaller than that of the adsorbents, this makes itself noticeable in a considerable reduction of the total expenditure for the filtering layer under consideration, in fact, for comparable overall properties and in particular for the same adsorption effect as with the known asbestos-containing filtering layers. In this connection it should be mentioned that by this means, also with the filtering layer under consideration, fully comparable resistance properties as with the known asbestos-containing filtering layers can be achieved, for example if a quarter of the asbestos is replaced by $\gamma$-aluminium oxide and the remaining three quarters are replaced by kieselguhr and/or kaolin.

Material compositions within the ranges indicated hereinbelow have revealed themselves to be particularly favourable for the filtering layer under consideration:

Sulphite cellulose—40 to 60% by weight
Kieselguhr—20 to 35% by weight
Kaolin—20 to 0% by weight
$\gamma$-aluminium oxide—20 to 5% by weight In this connection of γ-aluminium oxide may be partly replaced also by other adsorbents, in particular organic adsorbents in powder form, such as positively or negatively charged ion exchanging resins. The utilization of such additional, or partly replacing γ-aluminium oxide, adsorbents applies especially in such cases where the range of utilization of the filtering layer and thereby the liquid to be filtered are definitely predetermined, and with the aid of the additional adsorbents definitely earmarked component parts of the liquid, for whose absorption these additional adsorbents are especially suitable, have to be filtered.

A series of comparative tests between an example of embodiment of the filtering layer under consideration with 50% sulphite cellulose, 30% kieselguhr, 10% kaolin and 10% γ-aluminium oxide, and an asbestos-containing filtering layer with 40% sulphite cellulose, 20% kaolin and 40% asbestos revealed, for almost identical resistance values of the two filtering layers with a liquid to be filtered whose pH was comprised between 4 and 5, and in which bacteria and other micro-organisms as well as albumin and fats were suspended, a generally corresponding adsorption effect for the two filtering layers and thus comprehensive practically the same filtering properties for both filtering layers, in which connection, however, the total manufacturing costs of the asbestos-containing filtering layer were about 1.4 times more than those of the asbestos-free filtering layer, provided with γ-aluminium oxide as the adsorbent.

From this example it will be seen that the asbestos-free filtering layer under consideration supplies a substantial improvement as compared with the known asbestos-containing filtering layers, which improvement lies in the present case in the reduction of expenditure, though on raising the proportion of γ-aluminium oxide may lie also substantially in an increase of the adsoprtion effect. As regards the latter possibility, it must be indeed stated that the adsorption effect does not increase proportionally to the proportion of γ-aluminium oxide, but rather tends towards a saturation value, and with an increase of the proportion of γ-aluminium oxide a reduction of the resistance of the filtering layer also goes hand in hand, in such a manner that proportions of γ-aluminium oxide in excess of 20% by weight are suitable only in special cases, and the proportion of γ-aluminium oxide should preferably be kept below 20% by weight.

We claim:

1. An asbestos-free filter sheet for use in filtering liquids containing adsorbable turbid matter, said sheet being formed of a uniform mixture consisting essentially of at least one fibrous supporting material and at least one adsorbent for said adsorbable turbid matter, said adsorbent consisting essentially of fine particles of γ-aluminum oxide in an amount sufficient to substantially adsorb said adsorbable turbid matter.

2. The filter sheet of claim 1, wherein said γ-aluminum oxide is present in the amount of about 5–20% by weight of said mixture.

3. The filter sheet of claim 1, which contains in addition at least one organic adsorbent material.

4. A filter sheet according to claim 1, which contains a filler.

5. The sheet of claim 4, wherein said filler is kaolin or alumina.

6. A filter sheet according to claim 1, wherein said fibrous material comprises cellulose fibers.

7. The sheet of claim 6, wherein said cellulose fibers are at least one member of the group consisting of sulphite cellulose or sulphate cellulose.

8. A filter sheet according to claim 1, wherein kieselguhr is additionally embedded within said fibrous supporting layer.

9. An asbestos-free filter sheet for use in filtering liquids containing turbid matter, said sheet being formed of a uniform mixture consisting essentially of 40–60% by weight of cellulose fibers, about 5–20% by weight of γ-aluminum oxide, about 20–35% by weight of kieselguhr and about 0–20% by weight of kaolin.

* * * * *

UNITED STATES PATENT OFFICE
CERTIFICATE OF CORRECTION

Patent No. 4,149,975  Dated April 17, 1979

Inventor(s) Ernst Keim et al

It is certified that error appears in the above-identified patent and that said Letters Patent are hereby corrected as shown below:

In the Heading:

Item [30], Foreign Application Priority Data,

"Feb. 15, 1975" should read -- Feb. 14, 1975 --.

Signed and Sealed this

Seventh Day of August 1979

[SEAL]

Attest:

Attesting Officer

LUTRELLE F. PARKER
Acting Commissioner of Patents and Trademarks